United States Patent [19]
Nakamura et al.

[11] Patent Number: 5,177,612
[45] Date of Patent: Jan. 5, 1993

[54] SIGNAL SWITCHING OUTPUT DEVICE

[75] Inventors: Akihiro Nakamura; Hiroyasu Eguchi; Masami Suzuki, all of Tokorozawa, Japan

[73] Assignee: Pioneer Electronic Corporation, Tokyo, Japan

[21] Appl. No.: 709,947

[22] Filed: Jun. 4, 1991

[30] Foreign Application Priority Data

Nov. 13, 1990 [JP] Japan .................... 2-303845

[51] Int. Cl.⁵ .......................... H04N 5/262
[52] U.S. Cl. .......................... 358/183; 358/22
[58] Field of Search .......... 358/183, 22, 181

[56] References Cited

U.S. PATENT DOCUMENTS 3,936,868  2/1976  Thorpe ................ 358/183
4,218,698  8/1980  Bart et al. .
4,392,156  7/1983  Duca et al. ........... 358/183
4,432,016  2/1984  Shanley, II et al. ...... 358/183

FOREIGN PATENT DOCUMENTS 0138482  4/1985  European Pat. Off. ....... 358/22

OTHER PUBLICATIONS

"NHK", A Device for Superimposing Letters on a TV Screen ABU Technical Review (Japan) No. 23 pp. 13-15 Nov. 1972 358-183.

Primary Examiner—James J. Groody
Assistant Examiner—David E. Harvey
Attorney, Agent, or Firm—Sughrue, Mion Zinn Macpeak & Seas

[57] ABSTRACT

The signal switching ouput device comprises an attenuator which attenuates a brightness of an input image signal, a first switching means which alternatively outputs an output from said attenuator or said input image signal, delay circuits which delay a character signal by a specified time, a second switch which alternatively provides an output from said first switch and a character signal delayer by the specified time, and an switch instructing means which switches between said first switch and said second switch according to said character signal, and outputs an RGB signal showing a character while delaying it and lowers a brightness level of input image signals composing a background image during a specified period before and after the output of the RGB signal, so that a character displayed on a display unit is trimmed by a dark lines and are very easy to recognize.

8 Claims, 4 Drawing Sheets

FIG.4(A)    FIG.4(B)
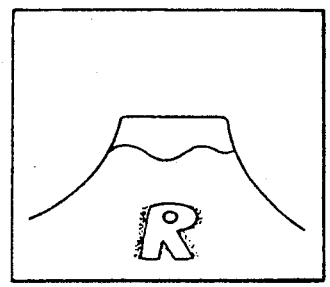   
FIG.5(A)    FIG.5(B)
PRIOR ART   PRIOR ART
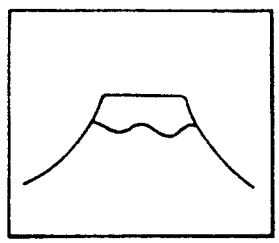  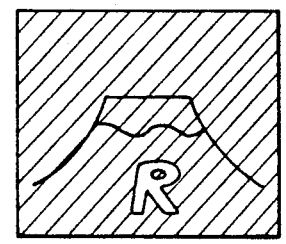

SIGNAL SWITCHING OUTPUT DEVICE

BACKGROUND OF THE INVENTION

This invention relates to a signal switching output device for television broadcasting or in a system device such as a VTR, a video disk player, or a compact disk player, for instance, to overlay (superimpose) characters based on an RGB signal such as an RGB image signal making use of the subcode of a compact disk over an image reproduced by a video disk player, for instance, on a display unit.

Sometimes characters such as time or telop are inserted, or characters are overlaid from a personal computer or according to an RGB signal stored in the subcode of a compact disk onto a TV screen or on a portion of an image based on image signals generated by a video disk player.

In overlaying a character over an image which is a background, if the character is white and the background image is bright and whitey, it is very hard to recognize the character.

As a method for solving a problem like this, a brightness level of image signals for the background other than the character is attenuated, and then character signals consisting of RGB signals are hybridized for overlaying the character over the background image.

Also, as another method for making an overlaid character easier to be recognized, a rectangular frame is arranged at a portion of a display screen where characters are displayed, and a color of an area inside the frame is kept black or grey, or a brightness level of a background image inside the rectangular frame is made lower than that of a surrounding area (Japanese Patent Publication No. 2-35510).

In the method for making the screen to be dark by lowering a brightness level of a background image described above, a displayed background image is darker than the original image, so that a viewer may recognize it as a different image. By lowering the signal level, also the level of synchronizing signals composing said image signal and the level of the color burst signal are attenuated. Then, since an hybridized image signal for the background image is used, as an output to a display unit, together with a synchronizing and a color burst signal, if the attenuation factor is too large, the possibility of causing a problem related to the operations of the display unit is high. Moreover, as the level of the image signal is attenuated, drop of S/N is inevitable.

Also in the latter method, wherein a black or grey rectangle is arranged at a portion of a screen, an image at the portion is hidden by the rectangle, which gives discomfort to users. Also in the case, wherein a brightness level of an image in the rectangle is made lower than that of an image surrounding the rectangle, a similar problem occurs.

SUMMARY OF THE INVENTION

A purpose of the present invention is to provide a device which allows reproduction of an image as a background screen, faithfully to the original image thereof, even in overlaying together with overlaid characters which are visible and easy to be recognized.

This invention was made to achieve the objectives as described above, and the signal switching output device, according to the present invention, comprises a means for attenuating a brightness level of an input image signal, a first switching means for alternatively outputting an output from the aforesaid means for attenuation or the aforesaid image signal, a delaying means for delaying a character signal by a specified time, a second switching means for alternatively outputting an output from the aforesaid first switching mean and the character signal delayed by the specified time, and a switching instructing means for switching between the aforesaid first switching means and the aforesaid second switching means according to the aforesaid character signal.

In a device according to the present invention, when an input image signal and a character based on an RGB image signal are overlaid, as the aforesaid character are hemmed along both edges in the horizontal direction, the visibility of the character to be overlaid is higher than that of the background image based on an input image signal.

BRIEF DESCRIPTION OF THE DRAWINGS

In the accompanying drawings:

FIG. 4 is an illustration showing an picture drawing sketch example of an image on a display unit of the signal switching output device according to the present invention;

FIG. 5 is an illustration showing an example of a conventional hybridizing system;

DETAILED DESCRIPTION OF THE INVENTION

As conductive to a full understanding of the nature and utility of the present invention, a brief consideration of a typical conventional signal switching output device will be first presented below with reference to FIG. 6 and FIG. 7 principally for the purpose of comparison therebetween.

First, description is made for the overlaying method by attenuating a brightness level of an image signal for a background other than a character to be overlaid and then hybridizing a character signal consisting of RGB signals with reference to FIG. 5. In this method, a hybridized image as shown in FIG. 5(B) is obtained by attenuating a brightness level of a background image as shown in FIG. 5(A) and then hybridizing and overlaying the background image with RGB signals composing a character. Namely, the background screen is darkened by attenuating a brightness level of the background image shown in FIG. 5(A) so that the character becomes more visible.

Figure 6:
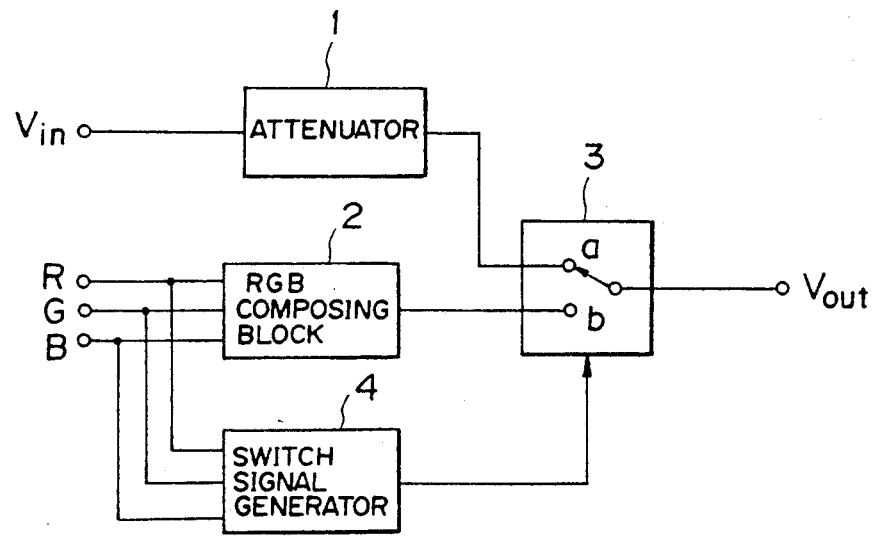
FIG. 6 is a block diagram showing an example of a conventional hybridizing system.

Description is made for an example of a system to obtain such an image with reference to a block diagram shown in FIG. 6.

An attenuator 1 is arranged to attenuate a brightness level of an input image signal Vin by a specified level. An RGB composing block 2 is arranged to output a composite image signal by composing RGB signals which are information on a character. The attenuator and the RGB composing block 2 are connected to a switcher 3 which outputs the aforesaid image signal and the aforesaid composite signal as a hybridized signal. A switch signal generator 4 is arranged to control operations of the switcher 3 according to the RGB signal. With this switch signal generator 4, a hybridized image signal Vout as shown in FIG. 7 is obtained by controlling a switching operation of the switcher 3 and selecting an input image signal and a composite signal at a good timing. Description is made hereunder for a method for detecting the switching control timing of the switch signal generator 4 as an example thereof.

The RGB signals composing a character to be overlaid carry, for instance, a blue color image information in a background block and a white color image information in the character, and the switch signal generator 4 can generate a switch timing signal by determining the color information carried by an RGB signal.

The switch signal generator 4 controls operations of the switcher 3 according to a timing signal obtained by means of the method as described above.

Figure 7:
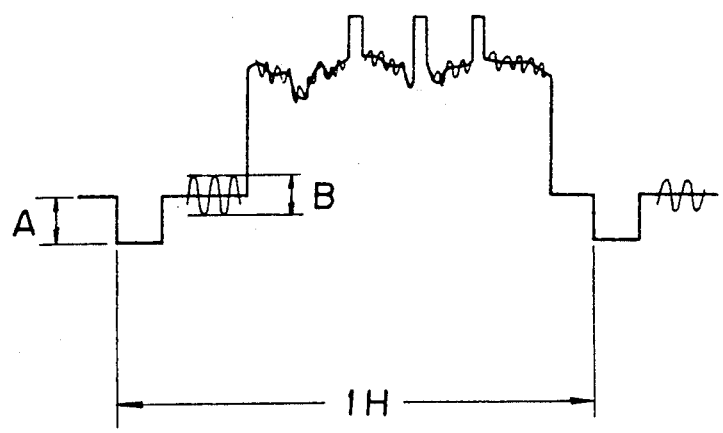
FIG. 7 is a waveform diagram showing an image signal output from a conventional hybridizing system.

Namely, a switch arranged in the switcher 3 selects a terminal "a" to which a signal from the attenuator is entered in a background portion of an RGB signal, and a terminal "b" to which a composite image signal is entered in a portion of a character to be overlaid, and provides an output of a hybridized image signal Vout as shown in FIG. 7 by repeating the switching operation as described above. Thus, if dependent on conventional technology, by lowering a signal level, also a level A of a synchronizing signal and a level B of a color burst signal are attenuated, which causes problems relating to operations of a display unit.

Detailed description is made hereunder for embodiments of this invention with reference to FIG. 1 through FIG. 4.

Figure 1:
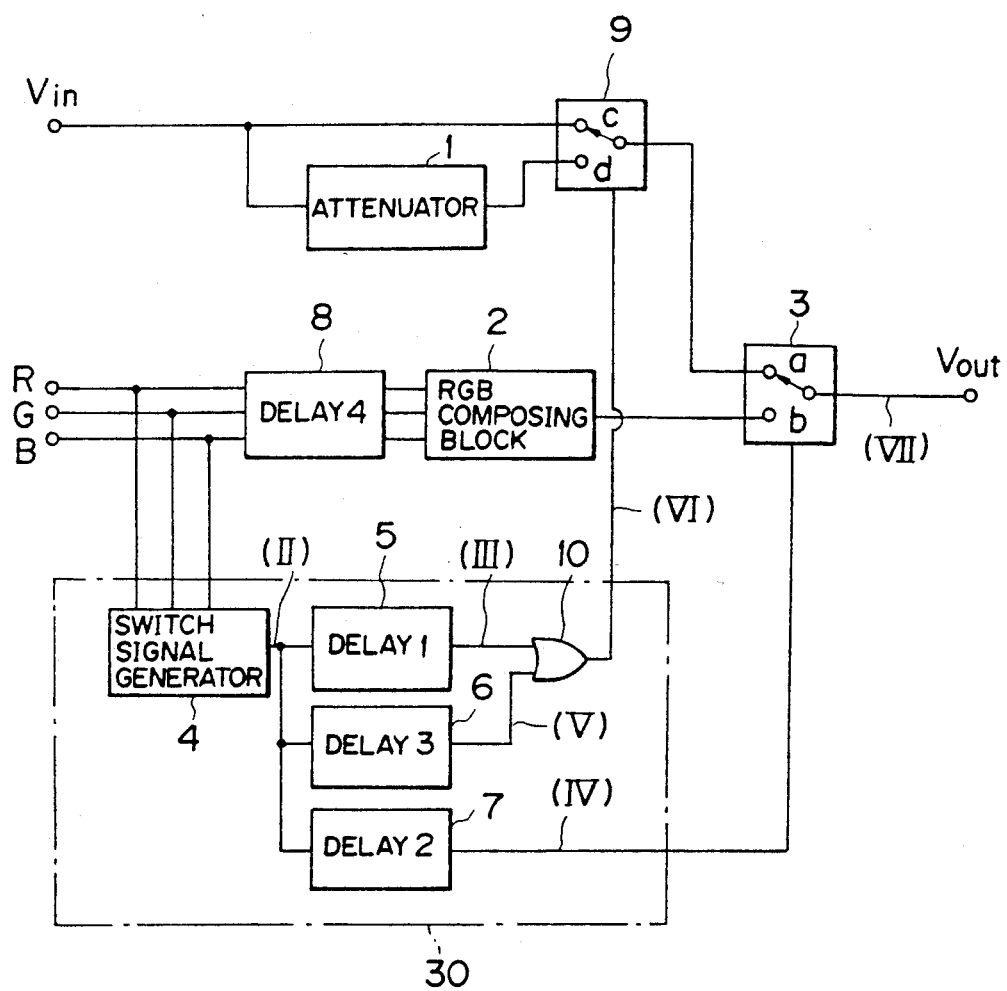
FIG. 1 is a block diagram showing an embodiment of the signal switching output device according to the present invention.
Figure 2:
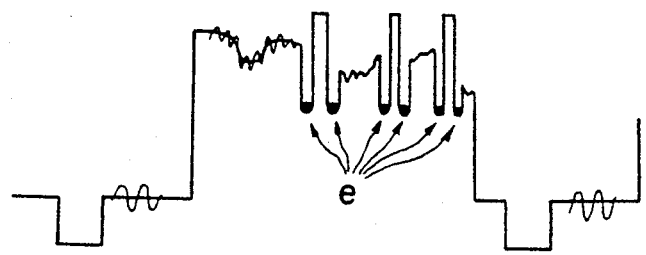
FIG. 2 is an illustration showing an example of an image signal output from the signal switching output device according to the present invention.

FIG. 1 is a block diagram of the signal switching output device according to this invention. In this figure, an attenuator 1, an RGB composing unit 2, a switcher 3, and a switch signal generator 4 have the same configuration as described above. Timing signals output from the switch signal generator 4 are entered to delay circuits 5, 6, and 7, which generate pulses delayed by a specified time respectively according to the entered signal. Control of a switcher 9 is carried out by the delay circuits 5 and 6 and the means for generating a switch signal. Control of the switcher 3 is carried out by the delay circuit 7. The RGB signals are delayed through a delay circuit 8. The delay circuits 5 and 6 are connected to an OR circuit 10. A switch instructing means 30, for switching between the two switchers 3 and 9 comprises the switch signal generator 4, three delay circuits 5, 6 and 7, and the OR circuit 10.

Figure 3:
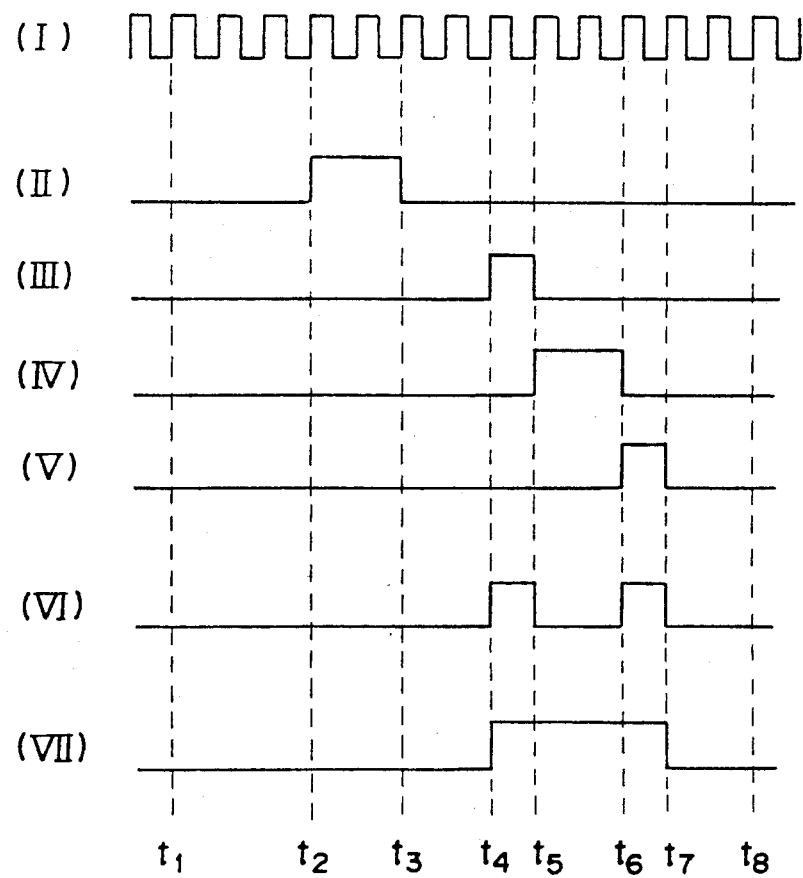
FIG. 3 is a time chart showing timing of operations related to the signal switching output signal according to the present invention.

Description concerning a timing of pulse generation in each of these delay circuits is made for an embodiment with reference to FIG. 3.

In FIG. 3, (I) is a reference clock signal generated by a clock generating circuit (not shown) arranged in the device. A timing for pulse generation in each delay circuit is decided according to this reference clock signal.

At a time $t_1$, the switch signal generator 4 has detected that the RGB signal is for a background, and in this case, an output pulse (II) is low. At the time, as the pulse (II) is still low, each output from the delay circuits 5, 6, and 7 is also low. For this reason, in the switcher 3 controlled according to an output from the delay circuit 7, the terminal "a", to which an image signal composing the background image is entered, is selected. At this time also, the delay circuits 5 and 6 output a pulse L, so that also an output from the OR circuit 10, to which these pulses are entered, is low. For this reason, a switcher 9, which is controlled according to an output from the OR circuit 10, selects a terminal "c" to which an input image signal is entered. Accordingly, at the time $t_1$, the input image signal Vin is output, as it is, as the hybridized image signal Vout.

For this reason, the input image signal Vin is output with the brightness control not controlled in the output Vout.

If the switch signal generator 4 detects at a time $t_1$ that the RGB signal is for a character with the output pulse (I) switched to high and detects at a time $t_3$ that the RGB signal is for a background with the output pulse switched to low, an output pulse (III) from the delay circuit 5 rises at a time $t_4$ delayed by 4 clocks from the time $t_2$ responding to a rise of the pulse (II) at the time $t_2$, generating a pulse having a 1 clock width, and falls at a time $t_5$. While the output pulse (III) from the delay circuits 5 is high, also the output pulse (VI) from the OR circuit 10 is high. During this time, the switcher 9, according to high state of the output pulse (VI), selects the terminal d where an input image signal with brightness level attenuated by the attenuator is entered. For this reason, the hybridized image output Vout becomes an attenuated input image signal. And, at the time $t_5$, the switcher 9 again selects the terminal c, while at this time $t_5$, the output pulse from the delay pulse (IV) rises delaying by 5 clocks from a rise of the pulse (II) through the delay circuit 8. The pulse (IV) falls, according to a fall of the pulse (II) at the time $t_3$ delaying by 5 clocks from the pulse (II). Namely, a same pulse is output according to the output pulse (II) from the switch signal generator 4, delayed by 5 clocks from said pulse (II).

According to the high state of the output pulse (IV), the switcher 3 selects the terminal b where an composite signal composing a character is entered from the terminal b. Therefore, a composite signal composing the character is provided as an output of the hybridized image signal Vout. And at a time $t_6$ when the pulse (IV) goes low, the switcher 3 again selects the terminal a.

At this time $t_6$, an output pulse (V) from the delay circuit 6 is turned high according to a fall of the output pulse (II), being delayed by 5 clocks from said pulse (II). Therefore, when the output pulse (V) goes high, an output pulse (VI) from the OR circuit 10 goes high, and the switcher 9 selects the terminal d. Thus, an attenuated image signal is provided as the output of the hydridized signal Vout.

At a time $t_7$, the output pulse (VI) goes low again, and the switcher 9 switches from the terminal d to the terminal c. Therefore, the input image signal is provided, as it is, as the output of the hybridized image output Vout. And, at a time $t_8$, as the output pulse does not rise excluding the high state from the time $t_2$ to the time $t_3$, the state at the time $t_7$ is still being maintained.

The above operations can be described, as follows, in relation to change of an output signal from the image output Vout. During a period from the time $t_1$ to the time $t_4$, input image signals composing the background image are output as they are, while, during a period from the time $t_4$ to the time $t_5$, attenuated signals are output. During a period from the time $t_5$ to the time $t_6$, composite image signals composing the character are output, and during a period from the time t₆ to the time t₇, attenuated input image signals are output as it is. This state is shown by a pulse (VII).

A composition of a hybridized image output signal obtained by repeating the operations as described above is described below with reference to FIG. 2.

A background portion of an RGB signal is composed of background signals based on input image signals. When the RGB signal is detected as a character portion, the attenuated input image signal (e in the figure) is outputted for a specified period of time. Then, a signal corresponding to a character based on the RGB signal exists, and an attenuated input image signal portion exists again. This attenuated composition is maintained for a specified period of time, and then the composition with the original input signal is restored.

FIG. 5 shows an example having a portion wherein characters at three places in one scan line on a display unit are overlaid.

A signal composed of the operations as described above is as shown in FIG. 4, when displayed on a display unit. A character based on RGB signals is overlaid over a background image based on input image signals. In addition to it, a brightness level of sections of the background screen corresponding to both edges of the overlaid character in the horizontal direction are attenuated, so that the both edges becomes darker as shown in FIG. 4(B).

A width of the both edges can be set arbitrarily by changing a decrease width of the background image brightness level, which can be achieved in the signal switching output device according to this invention by arbitrarily setting a timing for switching by the aforesaid switcher 9.

In the embodiment described above, the RGB signal is delayed by the delayed circuit 8 before composition of a composite image signal, but it is needless to say that a composite image signal after composition of an RGB signal may be delayed.

In this embodiment, the switcher 9 which selects an input image signal and an attenuated signal thereof is controlled according to output from the two delay circuits 5 and 6 via the OR circuit 10, but also, for instance, an "H" level switch signal may be loaded, with one circuit, to the switcher 9 during a period containing a specified period of time before and after an output of the output pulse (IV) corresponding to a character output period as well as a character period, namely during a period from the time t₄ to the time t₇.

As described above in detail, in the signal switching output device according to this invention, an RGB signal for a character is output, being delayed, and a brightness level of an input image signal for the background image is lowered in specified periods before and after the output, whereby the character displayed on a display is trimmed with a dark line and is very easy to recognize.

Moreover, also when a white character is overlaid, even if the background screen is bright and whitey, a problem of integration of the character with the background screen, which makes it hard to recognize the character itself, never occurs.

In the signal switching output device according to this invention, the above-described purpose is achieved with a simple configuration consisting an attenuator, delay circuits, select switches, and a control unit which controls said switches.

What is claimed is:

1. A signal switching output device, comprising:
   an attenuator for attenuating a brightness level of an input image signal which is to provide a background image and outputting an attenuated image signal,
   a first switching device selectively providing said attenuated image signal or said input image signal,
   a delaying means for delaying a character signal by a specified time to out a delayed character signal,
   a second switching device selectively providing an output from said first switching device or said delayed character signal, and
   a switch instructing device for controlling switching of said first switching device and said second switching device according to said character signal.

2. The signal switching output device according to claim 1, further comprising an RGB composition unit in which a composite image signal is output by composing RGB signals which are character information.

3. The signal switching output device according to claim 1, wherein said switch instructing means consists of a switch signal generator, a delay means connected to said switch signal generator, and an OR element connected to said delay means.

4. The signal switching output device according to claim 3, wherein said switch instructing means outputs an input image signal for a background when any switch signal is not generated by the switch signal generator.

5. The signal switching output device according to claim 3, wherein said switch instructing means switches between said first switching means and said second switching means so that input image signal with an attenuated brightness level is output before and after a character signal delayed by a specified time.

6. The signal switching output device according to claim 3, wherein said switch signal generator generates a switch timing signal according to an RGB signal.

7. The signal switching output device according to claim 1, wherein a width of both edges of a character can be changed by arbitrarily selecting a switch timing for said first switching means.

8. A signal switching output device, comprising:
   a signal attenuating means for attenuating an input image signal for providing a background image;
   a first switching means for selectively providing said input image signal or for providing an output from said signal attenuating means;
   a delaying means for delaying a character signal by a specified amount of time;
   a second switching means for selectively providing the output from said first switching means or for providing the output of said character signal delayed by the specified time; and
   a switch instructing means for switching between said first switching means and said second switching means.

* * * * *